United States Patent
Nuhn (10) Patent No.: US 10,788,052 B2
(45) Date of Patent: Sep. 29, 2020

(54) FLUID PUMP WITH MULTIPLE PUMP HEADS

(71) Applicant: Nuhn Industries Ltd., Sebringville (CA)

(72) Inventor: Ian Nuhn, Sebringville (CA)

(73) Assignee: Nuhn Industries Ltd., Sebringville (CA)

( * ) Notice: Subject to any disclaimer, the term of this patent is extended or adjusted under 35 U.S.C. 154(b) by 405 days.

(21) Appl. No.: 15/469,307

(22) Filed: Mar. 24, 2017

(65) Prior Publication Data

US 2017/0198722 A1 Jul. 13, 2017

Related U.S. Application Data (63) Continuation of application No. PCT/CA2015/050953, filed on Sep. 25, 2015.

(Continued)

(51) Int. Cl.
*F04D 1/04* (2006.01)
*F04D 29/62* (2006.01)
(Continued)

(52) U.S. Cl.
CPC ............ *F04D 29/628* (2013.01); *A01C 3/026* (2013.01); *A01C 23/045* (2013.01); *F04D 1/06* (2013.01);
(Continued)

(58) Field of Classification Search
CPC ..... F01D 1/12; F01D 1/14; F01D 1/16; F04D 19/007; F04D 3/00; F04D 17/00;
(Continued)

(56) References Cited

U.S. PATENT DOCUMENTS 951,162 A * 3/1910 Wedekind ............. F04D 25/163
415/66
1,040,543 A * 10/1912 Hughes ................. F04D 25/163
415/66

(Continued)

FOREIGN PATENT DOCUMENTS

CN 201546973 8/2010
CN 203441772 2/2014

(Continued)

OTHER PUBLICATIONS

McKee, Forbes, Mazhar, Entwistle, Howard; A review of major centrifugal pump failure modes with application to the water supply and sewerage industries, 2011 https://espace.curtin.edu.au/handle/20.500.11937/28560.

(Continued)

*Primary Examiner* — John Kwon
(74) *Attorney, Agent, or Firm* — Warner Norcross + Judd LLP (57) ABSTRACT

A fluid pump having at least two pump heads in series permits pumping fluid at both high pressure and high volumetric rate. Each pump head has at least two fluid conduits in fluid communication with a housing, the housing containing an impeller for drawing fluid through an inlet in the housing and moving the fluid through the fluid conduits. The at least two fluid conduits of one pump head combine fluid flow at the inlet of a neighboring pump head to provide a single flow of fluid through the inlet into the neighboring pump head. A drive structure passing through the inlets between two pump heads is configured to commonly drive the impellers in the housing of each pump head.

14 Claims, 9 Drawing Sheets

Related U.S. Application Data (60) Provisional application No. 62/055,020, filed on Sep. 25, 2014.

(51) Int. Cl.

| | | |
|---|---|---|
| *F04D 1/06* | (2006.01) | |
| *F04D 29/044* | (2006.01) | |
| *F04D 29/22* | (2006.01) | |
| *A01C 3/02* | (2006.01) | |
| *A01C 23/04* | (2006.01) | |
| *F04D 29/44* | (2006.01) | |

(52) U.S. Cl.
CPC ....... *F04D 29/044* (2013.01); *F04D 29/2222* (2013.01); *F04D 29/445* (2013.01); *F05D 2230/51* (2013.01); *F05D 2250/52* (2013.01)

(58) Field of Classification Search
CPC .......... F04D 17/08; F04D 1/063; F04D 17/16; F04D 17/12; F04D 17/122; F04D 17/125; F02C 3/107
USPC .... 415/44, 45, 52.1, 55.5, 55.6, 66, 68, 206, 415/209.1, 214.1, 198.1, 199.1–199.3
See application file for complete search history.

(56) References Cited

U.S. PATENT DOCUMENTS

| | | | |
|---|---|---|---|
| 2,204,857 A | | 6/1940 | Hollander |
| 2,981,464 A | * | 4/1961 | Omohundro ............ F04D 25/08 415/68 |
| 3,020,849 A | | 2/1962 | Reynolds |
| 3,851,998 A | | 12/1974 | Downing |
| 4,208,171 A | | 6/1980 | Jonsson |
| 5,431,545 A | | 7/1995 | Knight et al. |
| 5,435,664 A | | 7/1995 | Pettersson |
| 6,196,806 B1 | | 3/2001 | Van Der Sluis |
| 6,224,324 B1 | * | 5/2001 | Poinstingl ................. F01D 1/24 415/68 |
| 7,326,034 B2 | | 2/2008 | Sheth et al. |
| 7,642,682 B1 | * | 1/2010 | Matheny ................. F01D 15/10 310/90 |
| 7,828,510 B2 | * | 11/2010 | Chang ................... F04D 17/164 415/199.1 |
| 7,866,944 B2 | * | 1/2011 | Kenyon ............ A61M 16/0057 415/199.2 |
| 7,942,572 B2 | * | 5/2011 | Arletti ................... B01F 3/0811 366/263 |
| 8,241,011 B2 | * | 8/2012 | Huang .................. F04D 19/007 310/112 |
| 8,322,998 B2 | * | 12/2012 | Hanaoka ............... F04D 29/542 415/213.1 |
| 8,350,400 B2 | * | 1/2013 | Rosefsky ................ F03B 13/00 290/52 |
| 8,360,735 B2 | * | 1/2013 | Hanaoka ............... F04D 27/004 310/112 |
| 8,398,361 B2 | * | 3/2013 | Sagoo ..................... F04D 1/066 415/206 |
| 2007/0183892 A1 | * | 8/2007 | Sorokes ................. F04D 17/125 415/214.1 |
| 2010/0008757 A1 | * | 1/2010 | Yen ....................... F04D 19/007 415/68 |
| 2010/0189544 A1 | * | 7/2010 | Nakamura ............ F04D 19/007 415/68 |
| 2012/0224982 A1 | | 9/2012 | Nuhn |
| 2012/0328969 A1 | * | 12/2012 | DeWald ................ F04D 25/166 429/455 |
| 2013/0189076 A1 | * | 7/2013 | Liu ....................... F04D 29/522 415/68 |
| 2013/0343871 A1 | * | 12/2013 | Sun ....................... F04D 25/166 415/68 |
| 2014/0219775 A1 | * | 8/2014 | Shin ........................ F04D 19/02 415/66 |
| 2015/0044021 A1 | * | 2/2015 | Muller .................. F01D 13/003 415/1 |
| 2015/0125262 A1 | * | 5/2015 | Liu ....................... F04D 29/646 415/68 |
| 2015/0233391 A1 | * | 8/2015 | Liu ....................... F04D 29/668 415/68 |
| 2015/0330257 A1 | * | 11/2015 | Eybergen .................. F01K 7/36 60/670 |

FOREIGN PATENT DOCUMENTS

| | | |
|---|---|---|
| GB | 2027808 | 2/1980 |
| WO | 9117341 A1 | 11/1991 |
| WO | 9639583 A1 | 12/1996 |

OTHER PUBLICATIONS

PCT/CA2015/050953 International Search Report and Written Opinion of the International Searching Authority, dated Jan. 14, 2016.

* cited by examiner

FLUID PUMP WITH MULTIPLE PUMP HEADS

CROSS-REFERENCE TO RELATED APPLICATIONS

This application claims the benefit of U.S. patent application 62/055,020, filed Sep. 25, 2014, the contents of which are incorporated herein by reference.

FIELD

This application relates to pumps, in particular to pumps for pumping fluids.

BACKGROUND

Liquid manure from animal husbandry operations, particularly pig farming operations, is typically stored in a large manure reservoir or lagoon until there is a sufficient quantity available to spread or irrigate onto farm land for disposal. In order to remove the manure from the reservoir, a pump is used that is typically located alongside the reservoir and lowered into the reservoir. The pump can be free standing or attached to a tractor, which is often preferable to provide stability to the pump and a source of motive power for the pump.

A pump for pumping fluids at high volumetric flow rate (e.g. in excess of 4000 gal/min), particularly for pumping liquid manure from a reservoir, has been previously described in U.S. Patent Publication 2012/0224982 published Sep. 6, 2012, the contents of which is herein incorporated by reference. Such a pump has large fluid openings and generous tolerances in order that solid material in the reservoir can be accommodated by the pump without plugging. While excellent for pumping high volumes of fluid, such a pump generally operates at low pressure. For some applications, it may be desirable to not only pump fluid at high volumetric flow rate, but to also pump the fluid under high pressure.

Accordingly, there still exists a need for improved pumps, particularly pumps capable of pumping fluids at high volumetric flow rate and high pressure.

SUMMARY

In one aspect, there is provided a fluid pump comprising: a first pump head comprising a first housing containing a first impeller configured to move fluid through at least three first conduits in fluid communication with the first housing; a second pump head comprising a second housing containing a second impeller configure to move fluid through at least three second conduits in fluid communication with the second housing, the at least three second conduits in fluid communication with an inlet into the first housing along a fluid flow path between the first and second pump heads, the at least three second conduits combining fluid flow therethrough at the inlet to provide a single flow of fluid through the inlet into the first housing; and, a drive structure passing through the inlet between the first and second pump heads, the drive structure configured to commonly drive the first and second impellers.

In another aspect, there is provided a fluid pump comprising: a first pump head comprising a first housing containing a first impeller configured to move fluid through at least three first conduits in fluid communication with the first housing; a second pump head comprising a second housing containing a second impeller configured to move fluid through at least three second conduits in fluid communication with the second housing; a third pump head disposed between and in fluid communication with the first and second pump heads, the third pump head comprising a third housing containing a third impeller configured to move fluid through at least three third conduits in fluid communication with the third housing, the at least three third conduits in fluid communication with an inlet into the first housing along a first fluid flow path between the first and third pump heads, the at least three third conduits combining fluid flow therethrough to provide a single flow of fluid through the inlet into the first housing, the at least three second conduits in fluid communication with an inlet into the third housing along a second fluid flow path between the second and third pump heads, the at least three second conduits combining fluid flow therethrough to provide a single flow of fluid through the inlet into the third housing; and, a drive structure passing through the inlet into the first housing and the inlet into the third housing, the drive structure configured to commonly drive the first, second and third impellers.

In another aspect, there is provided a fluid pump comprising: a first pump head comprising a first housing containing a first impeller configured to move fluid through at least two first conduits in fluid communication with the first housing; a second pump head comprising a second housing containing a second impeller configured to move fluid through at least two second conduits in fluid communication with the second housing, the at least two second conduits in fluid communication with an inlet into the first housing along a fluid flow path between the first and second pump heads, the at least two second conduits combining fluid flow therethrough at the inlet to provide a single flow of fluid through the inlet into the first housing; and, a drive structure passing through the inlet between the first and second pump heads, the drive structure configured to commonly drive the first and second impellers.

In another aspect, there is provided a pump head for connecting two other pump heads in a fluid pump having at least three pump heads, the pump head comprising: a combiner comprising a fluid chamber in which fluid flow from at least two conduits are combined into a single flow of fluid that flows out of the chamber along a first fluid flow path into an inlet in a first neighboring pump head; a housing containing an impeller configured to move fluid through the at least two conduits in fluid communication with the housing, the housing comprising an inlet for receiving a single flow of fluid along a second fluid flow path from a second neighboring pump head; a drive structure passing through the first and second fluid flow paths connectable to drive structures of the first and second neighboring pump heads, the drive structure configured to commonly drive the impeller with impellers in the first and second neighboring pump heads; the combiner further comprising a first structure connectable to the first neighboring pump head; and, the housing further comprising a second structure connectable to a second neighboring pump head.

In another aspect, there is provided a pump assembly comprising a fluid pump as described above.

The fluid pump comprises two or more pump heads configured in series so that fluid being pumped moves from a reservoir into one pump head and thence to the next pump head in the series, to be eventually discharged from an outlet in a final pump head. Each pump head comprises a housing within which an impeller is contained, the impeller being driven by the drive structure to move fluid. The housing of the pump head comprises an inlet through which fluid is drawn from outside the housing, and the fluid is moved by the impeller from the housing into at least two fluid conduits, preferably at least three fluid conduits, more preferably three or four fluid conduits, to be combined into one fluid flow before exiting the pump head. One or more of the pump heads may comprise a combiner for combining fluid flow from the at least two fluid conduits into a single fluid flow. The combiner may comprise a fluid chamber in which fluid flow from the at least two conduits are combined into the single flow. The fluid chamber of the combiner may comprise openings to permit entry of the fluid from the conduits, and another opening to permit a single outward flow of the fluid from the pump head. The single flow of fluid from one pump head into another defines a fluid flow path between the pump heads.

The drive structure may comprise any one or collection of structures that is configured to impart rotational motion on the impellers. Although more than one power source may be employed, preferably, the drive structure is powered by a single power source, for example a suitable motor. The motor may be, for example, an electric motor, a hydraulic motor, a combustion motor or any other motor that can be configured to drive the drive structure. In one embodiment, the drive structure may comprise one or more drive shafts on which the impellers are mounted. Where there is a single drive shaft, all of the impellers may be mounted on the single drive shaft. Where there are two or more drive shafts, there may be at least one impeller mounted on each drive shaft.

Where there are two or more drive shafts, the drive shafts may be connected through one or more connectors so that one or more of the drive shafts may receive rotational motion from another of the drive shafts. Any one connector may be mounted on two separate drive shafts. Or any one connector may be mounted at one end on a drive shaft and at another end on an impeller, which is mounted on a drive shaft. Or any one connector may be mounted at two ends on separate impellers, which are mounted on respective drive shafts. When a connector is mounted on an impeller, the connector and impeller may form a unitary structure or may be removably connected. Connectors may extend out from the pump heads so that the connector bridges two pump heads and is partially disposed in one or both of the pump heads. In one embodiment, a connector may extend out through the inlet of one pump head. In one embodiment, a connector may extend out through an opening in a combiner of one pump head. In one embodiment, a connector may extend out through the inlet of one pump head and out through an opening in a combiner of a neighboring pump head. In one embodiment, at least a portion of each of the one or more connectors may be in the fluid flow path between respective pump heads.

In one embodiment, any one connector may comprise a sleeve within which one or both of the drive shafts is rigidly mounted to permit transmission of rotational motion from one drive shaft to the other. In one embodiment, one or both of the drive shafts may be frictionally mounted within the connector. In one embodiment, connector may be cylindrical, while in another embodiment the connector may be a tube having a central portion between two end portions, the end portions having larger diameters than the central portion.

Drive shafts within a pump head may extend out from the pump head in one or more directions or may be wholly contained within the pump head. Preferably, the drive shaft does not extend out through the inlet of the housing. Where two drive shafts are connected by a connector, the ends of the drive shafts being connected preferably do not extend outside the pump head. For an initial pump head where fluid is first drawn from a reservoir, the pump head may comprise an impeller having a closed cap configured to seat an end of the drive shaft.

The fluid pump comprises at least two pump heads, for example two, three or four pump heads. The pump heads are disposed in series so that fluid flows sequentially through each pump head of the pump, each pump head being in fluid communication with the pump head before and after in the series. The initial and final pump heads are in direct fluid communication with only one other pump head, the initial pump head drawing fluid from a reservoir in through an inlet in the housing of the initial pump head, and the final pump head expelling fluid out through an outlet of the final pump head. Pump heads may be connected to provide rigidity and a fluid seal between the pump heads. The pump heads may be removably connected or may be formed in a unitary structure. Removable connection of the pump heads permits modularity, thereby facilitating repair should one of the pump heads fail and facilitating the inclusion of more pump heads in the series. Inclusion of more pump heads increases the operating pressure of the pump, which can be tailored by adjusting the number of pump heads in the pump.

As described herein, the fluid pump cannot be constructed by simply stacking known pumps together. The initial and final pump heads have different design features to permit fluid flow from one pump head to the other, while commonly driving the impellers. Intermediate pump heads have design features of both the initial and final pump heads to permit the intermediate pump heads to cooperate with neighboring pump heads to permit series flow of fluid and common driving of the impellers.

A pump assembly comprises a fluid pump mounted on a support structure. The support structure may comprise any suitable apparatus that permits operation of the pump at a fluid reservoir. Some examples of support structures include a wheeled boom, a hitching assembly and a trailer. A wheeled boom may be configured to be towed behind a vehicle, for example a tractor or a truck, and configured to permit submersing the pump into a fluid reservoir. A hitching assembly may be configured to be attached to moveable arms to permit submersing the pump into a fluid reservoir. The hitching assembly maybe associated with a vehicle, for example a tractor or a truck, and the moveable arms powered by a hydraulic system on the vehicle. A trailer may be configured with a trailer bed on which the fluid pump rests, and a submersible pipe in fluid communication with the housing of the initial pump head may be configured to be immersed in a fluid reservoir to permit transfer of fluid from the reservoir into the initial pump head.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

FIGS. 1A-1D depict one embodiment of a fluid pump 1 of the present invention comprising two pump heads 10, 50 arranged in series so that fluid being pumped from a reservoir passes through second pump head 50 into first pump head 10 to be discharged out of first pump head 10 into a desired location, for example into a holding tank.

Figure 1A:
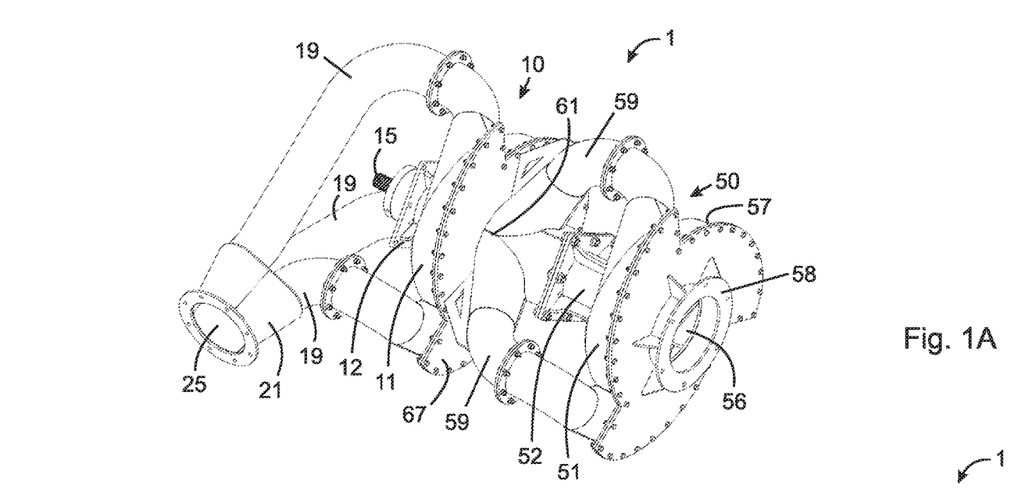
FIG. 1A is an elevation view of a first embodiment of a fluid pump having two pump heads in series and three fluid conduits per pump head.
Figure 1B:
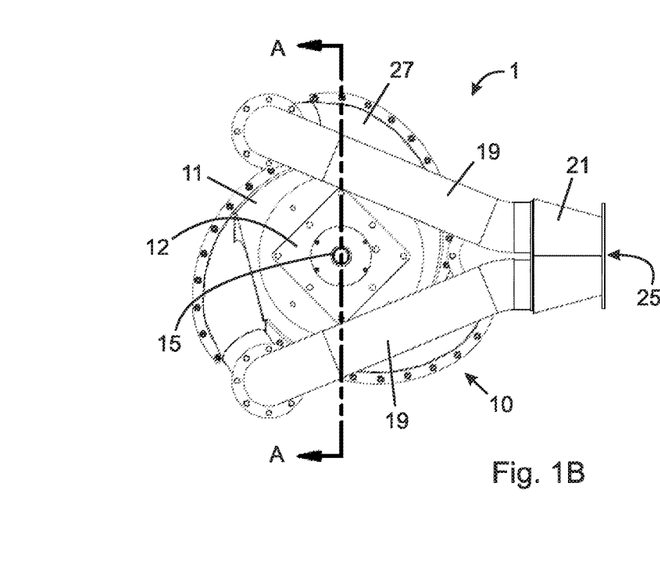
FIG. 1B is a top end view of the pump of FIG. 1A.
Figure 1C:
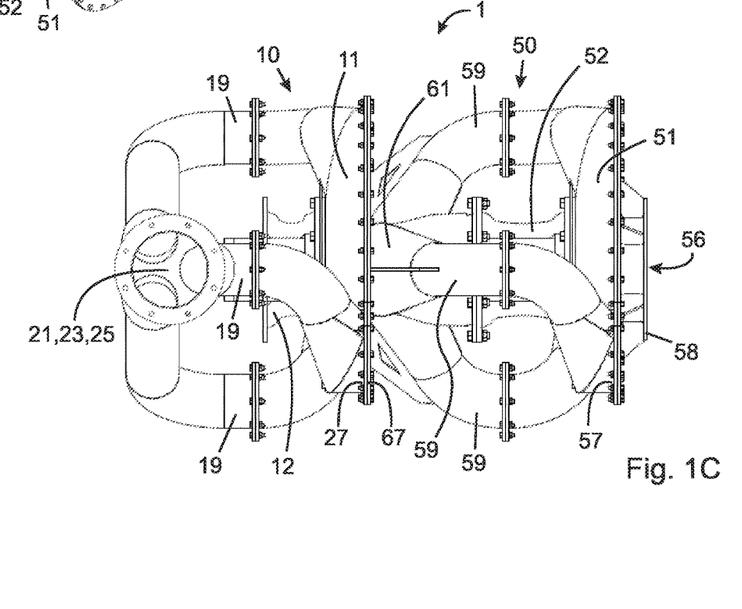
FIG. 1C is a side view of the pump of FIG. 1A.
Figure 1D:
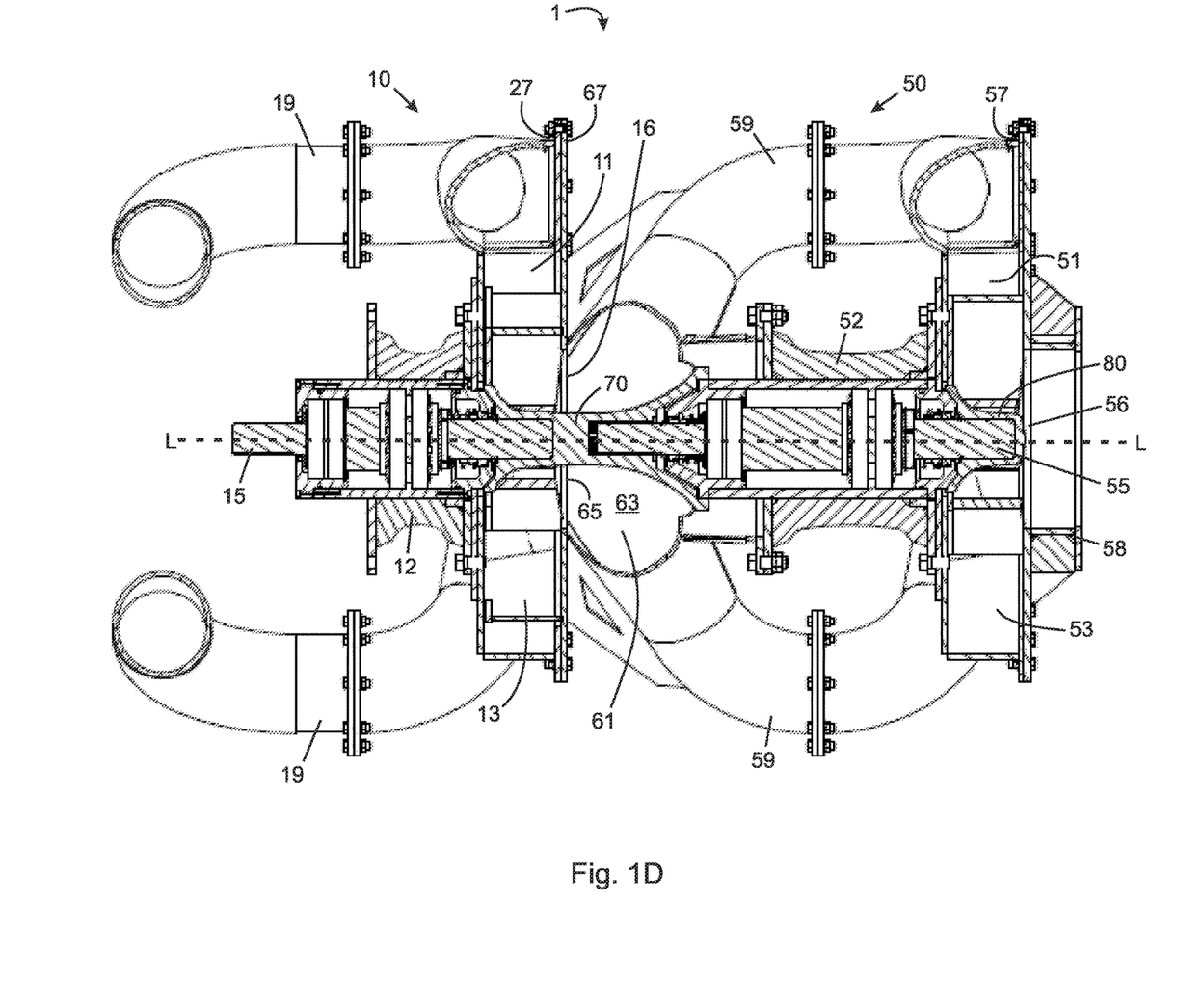
FIG. 1D is a side cross-section view of the pump of FIG. 1A taken through section A-A shown in FIG. 1B.

The second pump head 50 comprises a second housing 51 within which a second impeller 53 is mounted on a second drive shaft 55. The second drive shaft 55 is parallel to and concentric with a longitudinal axis L of the pump 1, although an eccentric arrangement may be used, and in some cases the drive shaft may form an oblique angle with longitudinal axis L. The second impeller 53 being driven by rotation of the second drive shaft 55 draws fluid from a fluid reservoir located outside the pump 1, the fluid entering the second housing 51 through a second inlet 56 (as best seen in FIG. 1D) in a base 57 of the second housing 51. The second inlet 56 is ringed by an inlet ring 58 surrounding a perimeter of the second inlet 56. The inlet ring 58 may be used to mount an immersion pipe to the pump 1. Fluid flows into the second housing 51 through the second inlet 56 in a single flow in a flow path parallel to a path defined by the longitudinal axis L of the pump 1. At a periphery of the second housing 51, three ports lead from an interior of the second housing 51 to three outwardly extending curved second fluid conduits 59. Fluid flows tangentially and outwardly from the second housing 51 into the second fluid conduits 59, the fluid thereby being diverted away from the longitudinal axis L of the pump 1. Fluid flowing in the three second fluid conduits 59 is combined into a single fluid flow at second combiner 61 where the three second fluid conduits 59 meet to form a second chamber 63 through which the longitudinal axis L passes. Fluid from the second chamber 63 passes through a second outlet 65 in a single flow in a flow path parallel to a path defined by the longitudinal axis L of the pump 1. The single flow of fluid passing out of the second outlet 65 of the second combiner 61 is preferably along the longitudinal axis L, more preferably concentric with the longitudinal axis L. The second housing 51 may further comprise a second housing extension 52 that serves to further enclose the second drive shaft 55 and any seals (e.g. O-rings), bearings or other components of the second pump head 50. The second housing extension 52 may also serve to support the second combiner 61 to provide extra rigidity and strength.

The first pump head 10 comprises a first housing 11 within which a first impeller 13 is mounted on a first drive shaft 15. The first drive shaft 15 is parallel to and concentric with a longitudinal axis L of the pump 1, although an eccentric arrangement may be used, and in some cases the drive shaft may form an oblique angle with longitudinal axis L. The first impeller 13 being driven by rotation of the first drive shaft 15 draws fluid from the second chamber 63 of the second combiner 61, the fluid entering the first housing 11 through a first inlet 16 (as best seen in FIG. 1D). Fluid flows into the first housing 11 through the first inlet 16 in a base 27 of the first housing 11 in a single flow in a flow path parallel to a path defined by the longitudinal axis L of the pump 1. The single flow of fluid passing through the first inlet 16 into the first housing 11 is preferably along the longitudinal axis L, more preferably concentric with the longitudinal axis L. At a periphery of the first housing 11, three ports lead from an interior of the first housing 11 to three outwardly extending curved first fluid conduits 19. Fluid flows tangentially and outwardly from the first housing 11 into the first fluid conduits 19, the fluid thereby being diverted away from the longitudinal axis L of the pump 1. Fluid flowing in the three first fluid conduits 19 is combined into a single fluid flow at first combiner 21 where the three first fluid conduits 19 meet to form a first chamber 23. The longitudinal axis L of the pump 1 does not pass through the first combiner 21 or the first chamber 23. Fluid from the first chamber 23 passes through a first outlet 25 in a single flow in a flow path oblique to, for example perpendicular to, a path defined by the longitudinal axis L of the pump 1. The first housing 11 may further comprise a first housing extension 12 that serves to further enclose the first drive shaft 15 and any seals (e.g. O-rings), bearings or other components of the first pump head 10.

The first and second pump heads 10, 50 are connected to each other so that the second outlet 65 of the second combiner 61 is in direct fluid communication with the first inlet 16 of the first housing 11. To connect the two pump heads 10, 50, the second combiner 61 may be attached to the base 27 of the first housing 11, for example by bolting, although any sufficiently secure attachment arrangement may be used.

Referring especially to FIG. 1D, the first and second pump heads 10, 50 are arranged so that the first and second drive shafts 15, 55 are longitudinally aligned, preferably along the longitudinal axis L of the pump 1. This arrangement also longitudinally aligns the flow path of the single flow of fluid into the second housing 51 with the flow path of the single flow of fluid into the first housing 11. In order to commonly drive the first and second drive shafts 15, 55, the first and second drive shafts 15, 55 are connected by a biconical tubular connector 70. The biconical tubular connector 70 bridges the first and second pump heads 10, 50 extending through the first inlet 16, through the second outlet 65 and through the second chamber 63 of the second combiner 61 to frictionally secure one end of the second drive shaft 55 in a hollow interior of the tubular connector 70. Thus, the tubular connector 70 is within the fluid flow path between the two pump heads 10, 50. The tubular connector 70 prevents fluid flowing from the second chamber 63 of the combiner 61 through the first inlet 16 into the first housing 11 from entering into a drive train comprising the tubular connector 70 and first and second drive shafts 15, 55 thereby protecting the drive shafts 15, 55 from corrosion and befouling. Frictionally securing the second drive shaft 55 in the tubular connector 70 permits removing the second drive shaft 55 from the tubular connector 70, which contributes to modularity as the first and second pump heads 10, 50 are then more easily separated should the need arise for maintenance on one of the pump heads or for inserting more pump heads between the first and second pump heads.

Figure 2A:
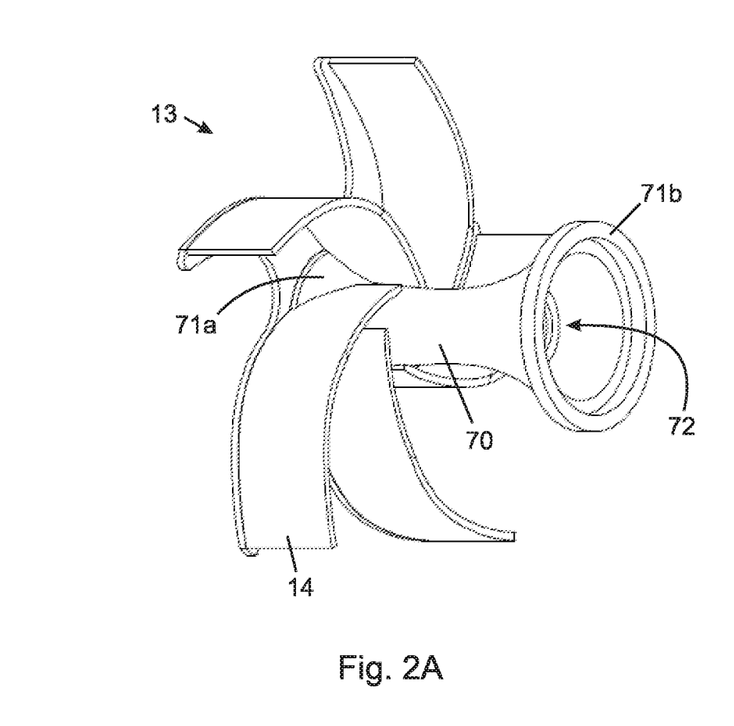
FIG. 2A is an elevation view of one embodiment of an impeller useable in a first pump head of a fluid pump of the present invention.

FIG. 2A provides a magnified view of the biconical tubular connector 70 illustrating that in this embodiment, a first end 71a of the tubular connector 70 is integrally formed with the first impeller 13 to provide extra strength to withstand torsional forces created when the first impeller 13 and tubular connector 70 are rotationally driven by the first drive shaft 15 on which the first impeller 13 is mounted. A second end 71b of the tubular connector 70 has an opening 72 through which the second drive shaft 55 may be inserted, the second drive shaft 55 being frictionally secured within the tubular connector 70. The first drive shaft 15 extends out of the first housing extension 12 to be operatively connected to a drive motor (not shown). Driving the first drive shaft 15 with the motor causes rotation of the first drive shaft 15, thereby causing rotation of the first impeller 13 mounted on the first drive shaft 15, thereby causing rotation of the tubular connector 70 integrally formed with the first impeller 13, thereby causing rotation of the second drive shaft 55 frictionally secured in the tubular connector 70, thereby causing rotation of the second impeller 53 mounted on the second drive shaft 55, which results in the two impellers 13, 53 being commonly driven. Thus, the entire drive train is longitudinally aligned with the longitudinal axis L of the pump 1, and the drive train passes through the fluid flow path of the fluid flowing between the first and second pump heads 10, 50.

Figure 2B:
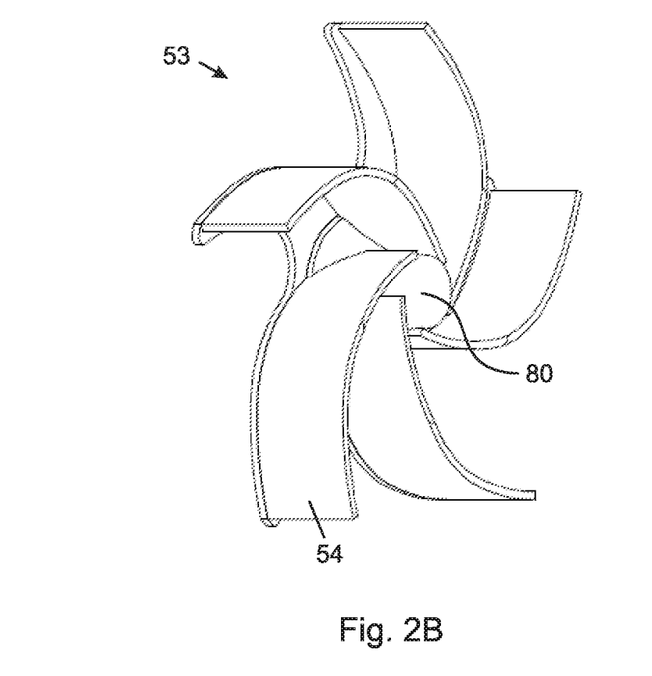
FIG. 2B is an elevation view of one embodiment of an impeller useable in a second pump head of a fluid pump of the present invention.
Figure 3A:
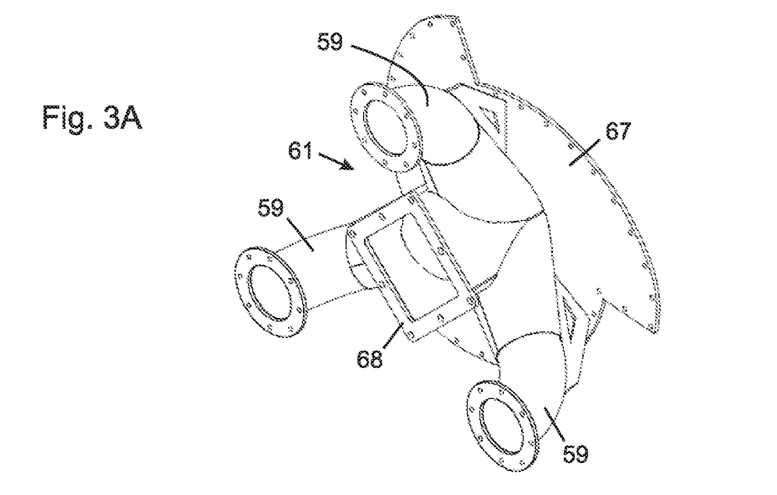
FIG. 3A is an elevation view of one embodiment of a combiner for a pump head in a fluid pump of the present invention.
Figure 3B:
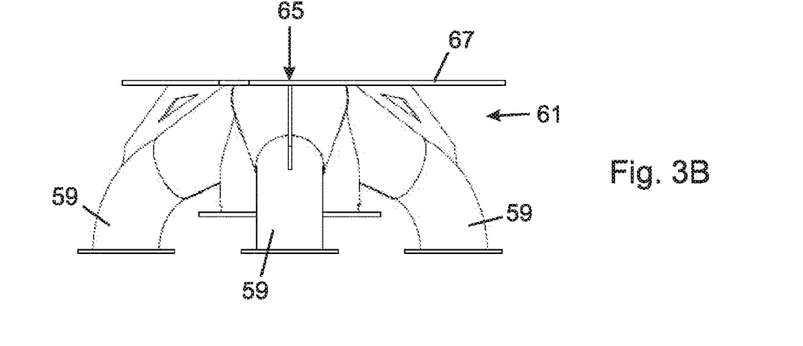
FIG. 3B is a side view of the combiner of FIG. 3A.
Figure 3C:
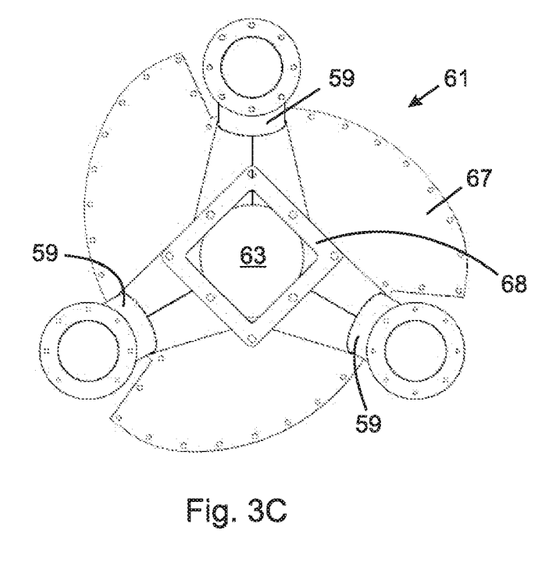
FIG. 3C is a top view of the combiner of FIG. 3A.
Figure 3D:
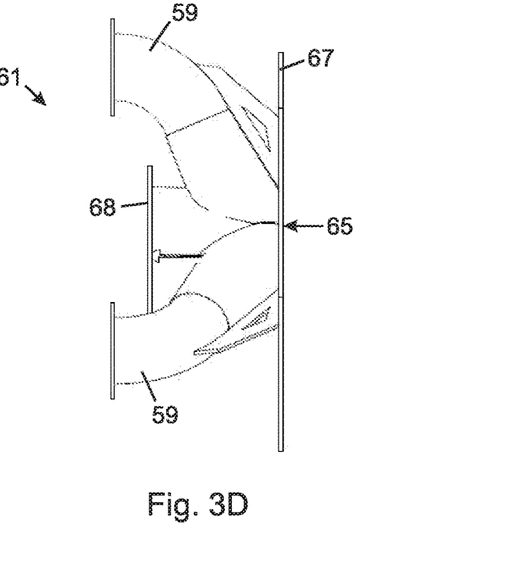
FIG. 3D is a side view of the combiner of FIG. 3A viewed from an angle of 90-degrees with respect to the view in FIG. 3B.

Still referring to FIG. 1D, second drive shaft 55 has an end that extends into the second housing 51 but does not protrude out of the second inlet 56. At this end, the second drive shaft 55 is capped with a bell-shaped cap 80 to prevent fluid from entering into the drive train thereby protecting the drive shaft 15 from corrosion and befouling. FIG. 2B provides a magnified view of the bell-shaped cap 80 showing that the bell-shaped cap 80 may be integrally formed with the second impeller 53. Both FIG. 2A and FIG. 2B illustrate impellers having five arcuate vanes. The first impeller 13 comprises five arcuate vanes 14 (only one labeled) and the second impeller 53 comprises five arcuate vanes 54 (only one labeled). There may be more or less vanes and the vanes may be of another shape, however, such an impeller arrangement as shown in FIG. 2A and FIG. 2B is efficient for moving fluid tangentially outwardly to the ports and thence to the outwardly extending curved fluid conduits.

The second combiner 61 is configured for direct fluid communication with the first inlet 16 of the first housing 11. As illustrated in FIGS. 1A-1D and FIGS. 3A-3D, the second combiner 61 comprises a mounting plate 67, which is shaped and configured to be secured to the base 27 of the first housing 11. The second combiner 61 may also comprise a combiner extension 68 configured to be secured to the second housing extension 52 so that the second combiner 61 may be detached from the second housing 61. The mounting plate 67 and the combiner extension 68 contribute to modularity and ease of assembly of the second pump head 50 and pump 1. At the second combiner 61, the second fluid conduits 59 meet to form second chamber 63 where fluid combines before flowing out through the second outlet 65. The fluid conduits, including one or both of the first and second fluid conduits 19, 59, and any one or more of the fluid conduits for a particular pump head, may be formed in a unitary manner or may be formed of segments of conduits to facilitate assembly of the pump 1.

Figure 4A:
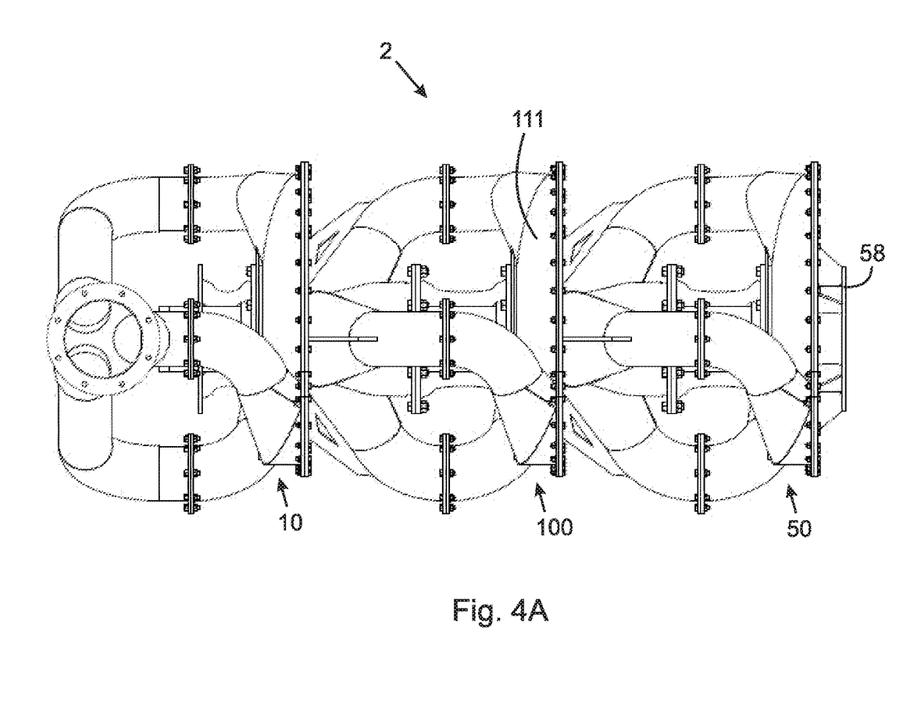
FIG. 4A is side view of a second embodiment of a fluid pump having three pump heads in series and three fluid conduits per pump head.
Figure 4B:
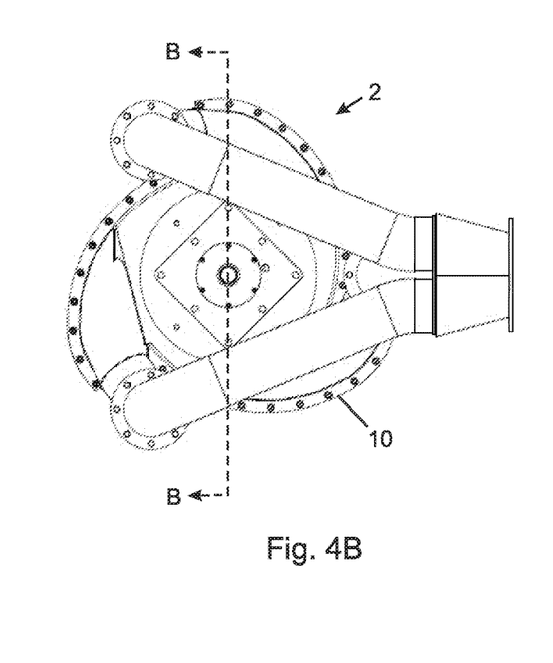
FIG. 4B is a top view of the pump of FIG. 4A.
Figure 4C:
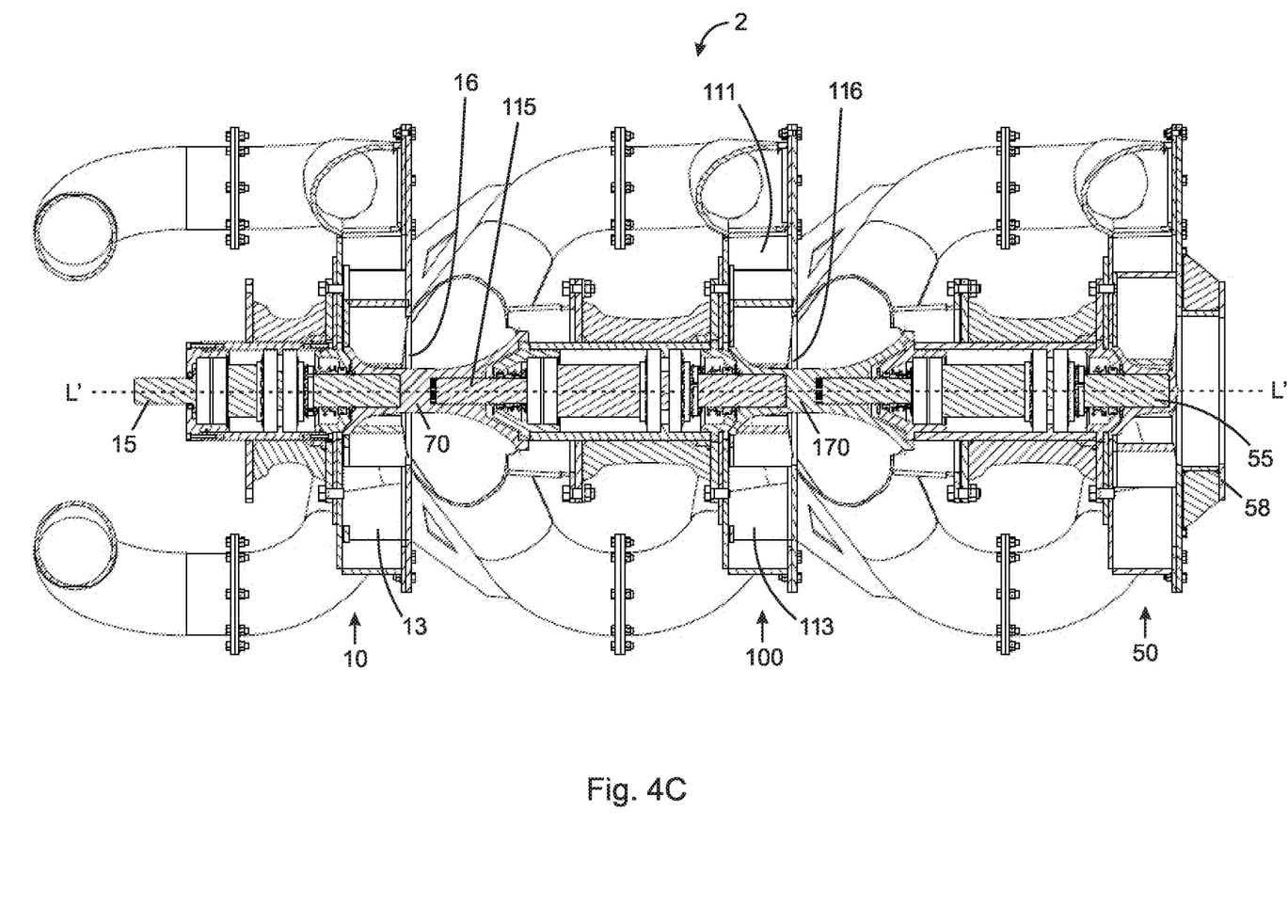
FIG. 4C is a cross-section view of the pump of FIG. 4A taken through section B-B shown in FIG. 4B.

FIGS. 4A-4C depict another embodiment of a fluid pump 2 of the present invention comprising three pump heads 10, 50, 100 arranged in series so that fluid being pumped from a reservoir passes through second pump head 50 into third pump head 100 and then into first pump head 10 to be discharged out of first pump head 10 into a desired location, for example into a holding tank.

The first and second pump heads 10, 50 are as described above for the fluid pump 1. The third pump head 100 is the same as the second pump head 50, except that third inlet 116 of the third pump head 100 is designed like the inlet 16 of the first pump head 10. Thus, the third inlet 116 is not ringed by an inlet ring such as the inlet ring 58 on the second pump head 50. Further, third drive shaft 115 in the third pump head 100 aligns with both the first drive shaft 15 and the second drive shaft 55, with a third impeller 113 in a third housing 111 of the third pump head 100 comprising a second biconical tubular connector 170 formed as a unitary structure with the third impeller 113. The second drive shaft 55 is frictionally secured in the second biconical tubular connector 170. Thus, unlike in the second pump head 50, the third drive shaft 115 in the third housing 111 of the third pump head 100 is not capped by a bell-shaped cap. Furthermore, the biconical tubular connector 70, which is integrally formed with the first impeller 13 has an end of the third drive shaft 115 frictionally secured therein. Thus, the entire drive train is collinear along longitudinal axis L' and all of the impellers may be commonly driven by one motor. One or more additional pump heads identical in construction to the third pump head 100 may be inserted into the series of pump heads to provide a pump with greater operating pressure.

A pump assembly may be formed by mounting a fluid pump of the present invention on a support structure. The support structure may comprise any suitable apparatus that permits operation of the fluid pump at a fluid reservoir. Some examples of support structures include a wheeled boom, a hitching assembly and a trailer.

Figure 5:
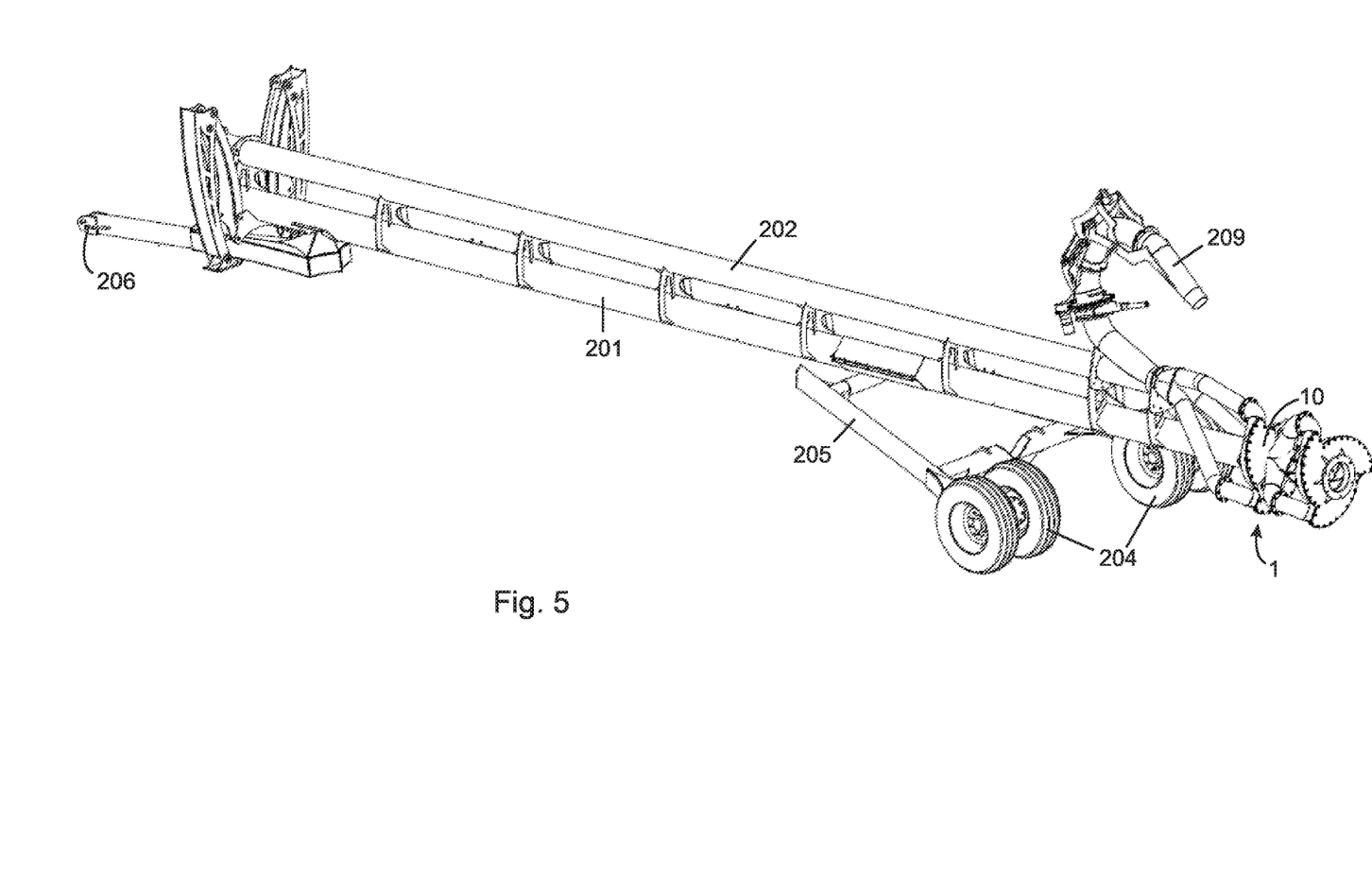
FIG. 5 depicts the pump of FIG. 1A mounted on a wheeled boom.

FIG. 5 depicts the fluid pump 1 described above mounted on a first end of a boom 201. The boom 201 comprises two sets of wheels 204 mounted on the boom 201 through a wheel frame 205 proximate the first end of the boom 201 to form a wheeled boom. A second end of the boom 201 comprises a towing hitch 206 for securement to a vehicle for transporting the wheeled boom with the pump from location to location. An elongated fluid conduit 202 extending between the first and second ends of the boom 201 is in fluid communication with the outlet of the first pump head 10 and carries pumped fluid from the fluid pump 1 to a tank (not shown) or some other fluid holding apparatus. The outlet of the first pump head 10 is also in fluid communication with agitator nozzle 209 so that a portion of the fluid being pumped is directed through the agitator nozzle 209 to be sprayed back into the fluid reservoir in order to encourage mixing of the fluid in the fluid reservoir. The agitator nozzle 209 is configured to be moveable so that the nozzle 209 may be pointed in a desired direction.

Figure 6:
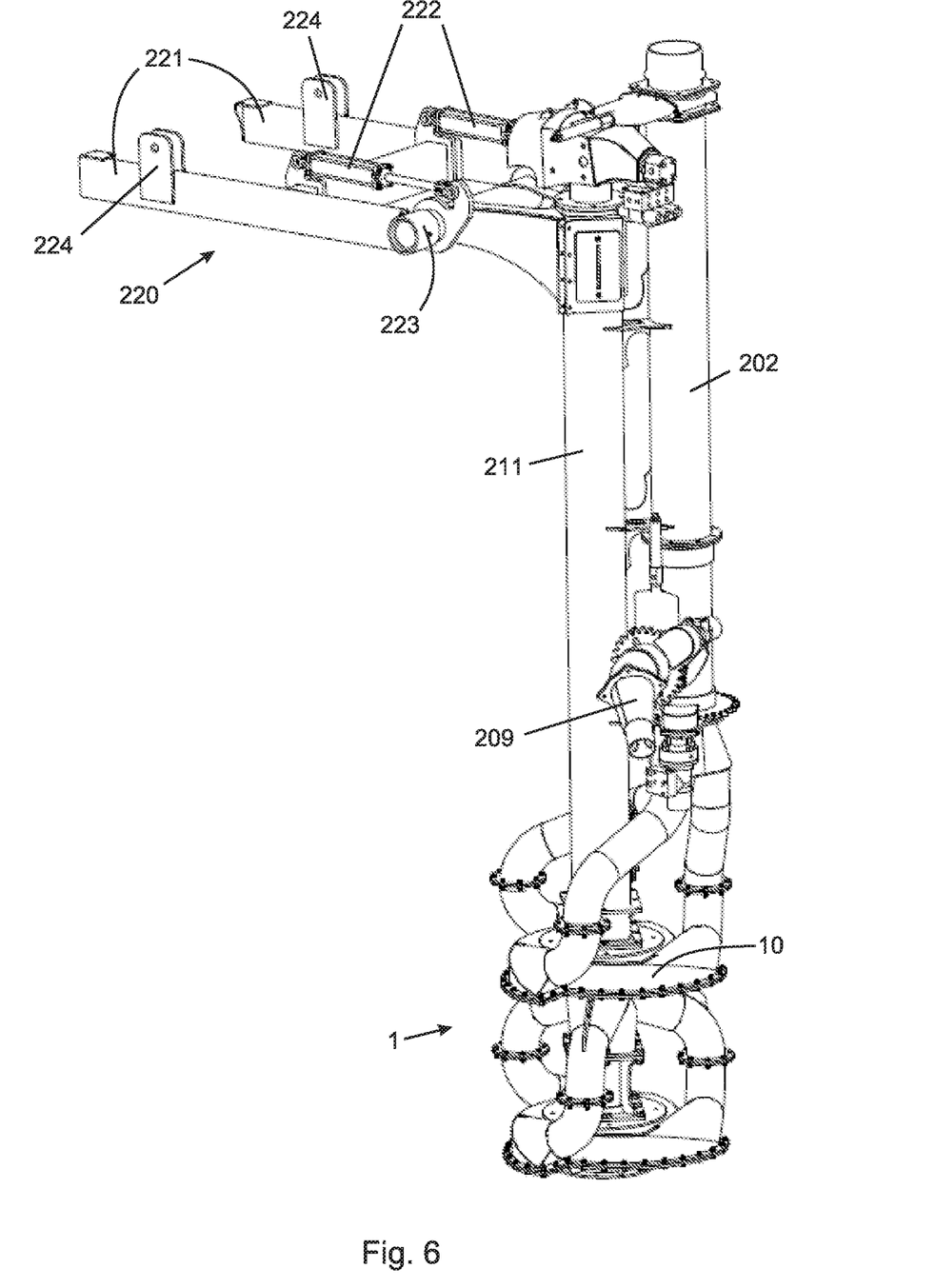
FIG. 6 depicts the pump of FIG. 1A mounted on a hitching assembly.

FIG. 6 depicts the fluid pump 1 described above mounted on a hitching assembly 220. The hitching assembly 220 comprises a pump support 211 on a first end of which the pump 1 is mounted. A second end of the pump support 211 is pivotally mounted on two arms 221, each of the two arms 221 comprising mounting brackets 224 for mounting the hitch assembly 220 on a vehicle. Hydraulic cylinders 222 actuatable from a cab of the vehicle retract or extend to permit pivoting of the pump support 211 around pivot rod 223 extending between the arms 221. Pivoting of the pump support 211 permits raising the pump 1 out of a fluid reservoir, or lowering the pump 1 into the fluid reservoir. An elongated fluid conduit 202 extending between the first and second ends of the pump support 211 is in fluid communication with the outlet of the first pump head 10 and carries pumped fluid from the fluid pump 1 to a tank (not shown) or some other fluid holding apparatus. The outlet of the first pump head 10 is also in fluid communication with agitator nozzle 209 so that a portion of the fluid being pumped is directed through the agitator nozzle 209 to be sprayed back into the fluid reservoir in order to encourage mixing of the fluid in the fluid reservoir. The agitator nozzle 209 is configured to be moveable so that the nozzle 209 may be pointed in a desired direction.

Figure 7:
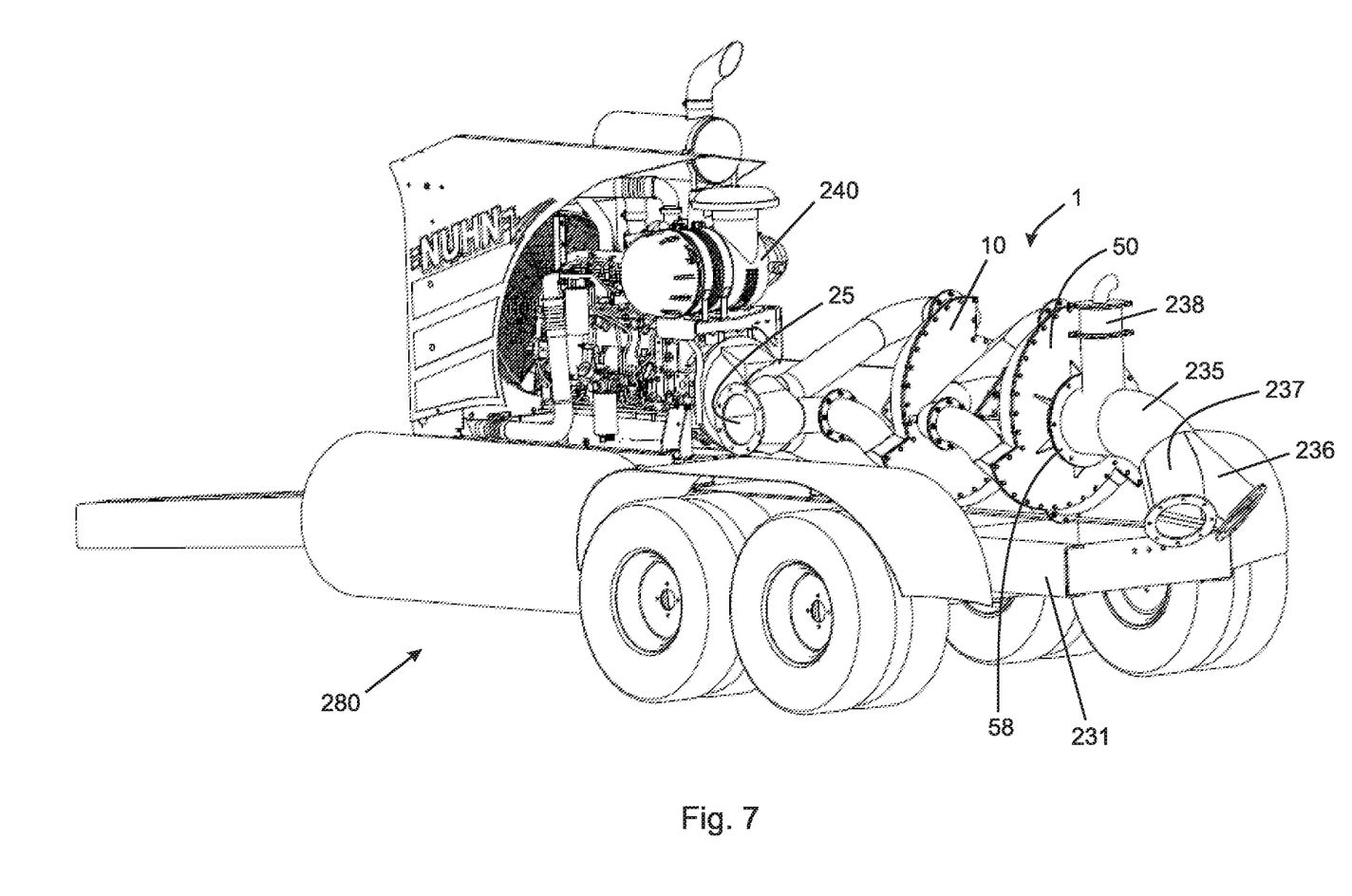
FIG. 7 depicts the pump of FIG. 1A mounted on a trailer.

FIG. 7 depicts the fluid pump 1 described above mounted on a trailer 230. The fluid pump 1 rests on a trailer bed 231, the trailer bed 231 also supporting a motor unit 240 for driving the drive train of the fluid pump 1. Attached to the inlet ring 58 of the second pump head 50 of the pump 1 is a feed pipe 235 in fluid communication with the inlet into the second pump head 50. The fed pipe 235 may bifurcate into two immersion pipes 236, 237, which can be extended to be immersed in the fluid reservoir to provide two fluid flows into the feed pipe 235. A vent pipe 238 extending upwardly from the feed pipe 235 and in fluid communication with the feed pipe 235 and open to the atmosphere ensures that pressure in the feed pipe 235 does not become excessive. The motor assembly 240 drives the drive train of pump 1 to draw fluid from the reservoir (not shown) which is ultimately discharged through the first outlet 25 of the first pump head 10 into a fluid conduit (not shown) and then into a holding tank (not shown) or some other fluid holding apparatus.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A liquid pump comprising:
a first pump head comprising a first housing having a first inlet and at least three first conduits in fluid communication with the first inlet, and said first housing containing a first impeller configured to move liquid through the at least three first conduits from the first inlet;
a second pump head comprising a second housing having a second inlet configured to receive liquid from a liquid reservoir and at least three second conduits in fluid communication with the second inlet and the first inlet of the first housing, the second housing containing a second impeller configured to move liquid through the at least three second conduits from the second inlet, the at least three second conduits being in fluid communication with the first inlet into the first housing along a liquid flow path between the first and second pump heads;
a combiner comprising a liquid chamber being in fluid communication with the first inlet of the first housing and the at least three second conduits and combining the liquid flow from the at least three second conduits to provide a single flow of liquid to the first inlet of the first housing; and,
a drive structure passing through the liquid chamber from the first housing but isolated from the liquid in the liquid chamber to commonly drive the first and second impellers, the drive structure comprising a first drive shaft on which the first impeller is mounted, a second drive shaft on which the second impeller is mounted, and a connector, the connector comprising a sleeve within which one or both of the first and second drive shafts is mounted to transmit rotational motion between the first drive shaft and the second drive shaft but wherein the first drive shaft is not directly coupled with and does not touch the second drive shaft and instead is indirectly coupled with the second drive shaft via the connector.

2. The pump according to claim 1, wherein at least a portion of the connector is in the liquid flow path.

3. The pump according to claim 1, wherein both of the first and second drive shafts are mounted in the sleeve.

4. The pump according to claim 1, wherein the one or both of the first and second drive shafts is frictionally mounted within the sleeve.

5. The pump according to claim 1, wherein the sleeve comprises a tube having a central portion between two end portions, the end portions having larger diameters than the central portion.

6. The pump according to claim 1, wherein the connector connects the first impeller to the second drive shaft.

7. The pump according to claim 6, wherein the connector and the first impeller are formed in a unitary structure.

8. The pump according to claim 6, wherein the connector and the first impeller are removably connected.

9. The pump according to claim 1, wherein the first drive shaft does not extend out through the first inlet of the first housing.

10. The pump according to claim 1, wherein the second drive shaft does not extend out of the second pump head.

11. The pump according to claim 10, wherein the second impeller comprises a closed cap configured to seat an end of the second drive shaft.

12. The pump according to claim 1, wherein the drive structure further comprises a closed cap configured to seat an end of one of the first and second the drive shafts.

13. The pump according to claim 1, wherein the first pump head is removably connected to the second pump head.

14. A pump assembly comprising the liquid pump as defined in claim 1 mounted on a support structure.

* * * * *